(12) United States Patent
Rybar et al.

(10) Patent No.: US 7,144,500 B2
(45) Date of Patent: Dec. 5, 2006

(54) VARIABLE SPEED WASTE REMOVAL SYSTEM

(75) Inventors: Stephen M. Rybar, Richmond, VA (US); Roger D. Hamill, Midlothian, VA (US)

(73) Assignee: Ondeo Degremont, Inc. VA (US)

( * ) Notice: Subject to any disclaimer, the term of this patent is extended or adjusted under 35 U.S.C. 154(b) by 389 days.

(21) Appl. No.: 10/455,069

(22) Filed: Jun. 5, 2003

(65) Prior Publication Data

US 2004/0245159 A1    Dec. 9, 2004

(51) Int. Cl.
*B01D 35/16* (2006.01)
(52) U.S. Cl. ............... 210/88; 210/91; 210/98; 210/106; 210/143; 210/159
(58) Field of Classification Search ........... 210/158, 210/159, 106, 107, 98, 88, 91, 143, 162, 210/167
See application file for complete search history.

(56) References Cited

U.S. PATENT DOCUMENTS

| | | | | |
|---|---|---|---|---|
| 3,601,504 | A | * | 8/1971 | McBurnett .................. 417/43 |
| 4,857,182 | A | * | 8/1989 | Jackson ..................... 210/104 |
| 4,917,796 | A | * | 4/1990 | Rudzinski ................... 210/159 |
| 5,074,996 | A | * | 12/1991 | Galanty et al. ............. 210/141 |

OTHER PUBLICATIONS

Letter describing two-speed mechanical bar screen system in Chicago, Illinois more than one year prior to the filing of the instant patent application.

* cited by examiner

*Primary Examiner*—Terry K. Cecil
(74) *Attorney, Agent, or Firm*—DLA Piper US LLP

(57) ABSTRACT

The invention is directed to a system for removing waste material from a fluid flowing in a channel. This system may incorporate the use of a trap for collecting the waste material while allowing the fluid to pass; a rake for removing the waste material away from the trap; a drive assembly for moving the rake to remove the waste material; a prime mover for operating the drive assembly; and a variable speed controller configured for operating the prime mover over a variable range of speeds.

7 Claims, 3 Drawing Sheets

VARIABLE SPEED WASTE REMOVAL SYSTEM

FIELD OF THE INVENTION

The field of the invention is wastewater cleaning systems, and more particularly systems for removing debris and other materials from wastewater.

BACKGROUND

Systems are needed for the removal of unwanted material from wastewater and other fluids. For example, bar screens are often used to protect a wastewater plant or pumping station against the entry of large objects that are likely to cause blockage in different parts of the installation, and to separate and extract bulky matter carried in the raw influent that is likely to interfere with subsequent operation or to create complications in the treatment process.

Screening is typically performed either with manually-cleaned bar screens or (when the plant is sufficiently large) with an automatically-cleaned bar screen system called a mechanical bar screen. These bar screen systems are typically installed in a fluid channel prior to entry of the influent to the treatment system to physically remove debris from the fluid as it travels along the channel.

These systems may utilize a hoist rope, pin rack or other such system to which a rake is attached. The bar screen extends down from the rack into the fluid channel to collect the debris. An electric motor, and possibly a hydraulic fluid pump, is typically used to drive the rake, forcing it down into the fluid, where it scoops up debris, dragging it up along the bar screen and up to a discharge apron, where the debris falls into a disposal unit, such as a cart or other conveyor.

During this process, the flow of the fluid through the channel does not need to be interrupted, and continues to flow during the cleaning process. While the mechanical bar screen normally operates at predetermined speed based upon the flow rate of the influent, systems are also known that may operate at two predetermined speeds; one for the off-peak flow rate and one for the peak flow rate. The system may be switched between these two speeds by the operator.

However, such systems cannot be adaptively controlled to account for ongoing variations in the flow rate of the fluid through the channel, and therefore cannot operate at maximum efficiency when fluctuations in flow rate occur. A system is therefore needed that improves upon these other designs.

SUMMARY OF THE INVENTION

Embodiments of the invention may include a system for removing waste material from a fluid flowing in a channel. This system may incorporate the use of a trap for collecting the waste material while allowing the fluid to pass; a rake for removing the waste material away from the rack; a drive assembly for moving the rake to remove the waste material; a prime mover for operating the drive assembly; and a variable speed controller configured for operating the prime mover over a variable range of speeds.

BRIEF DESCRIPTION OF THE DRAWINGS

The foregoing and other aspects and advantages will be better understood from the following detailed description of the invention with reference to the drawings, in which.

DETAILED DESCRIPTION

The invention will be understood more fully from the detailed description given below and from the accompanying drawings of the preferred embodiments of the invention; which, however, should not be taken to limit the invention to a specific embodiment, but are for explanation and understanding only.

Figure 1:
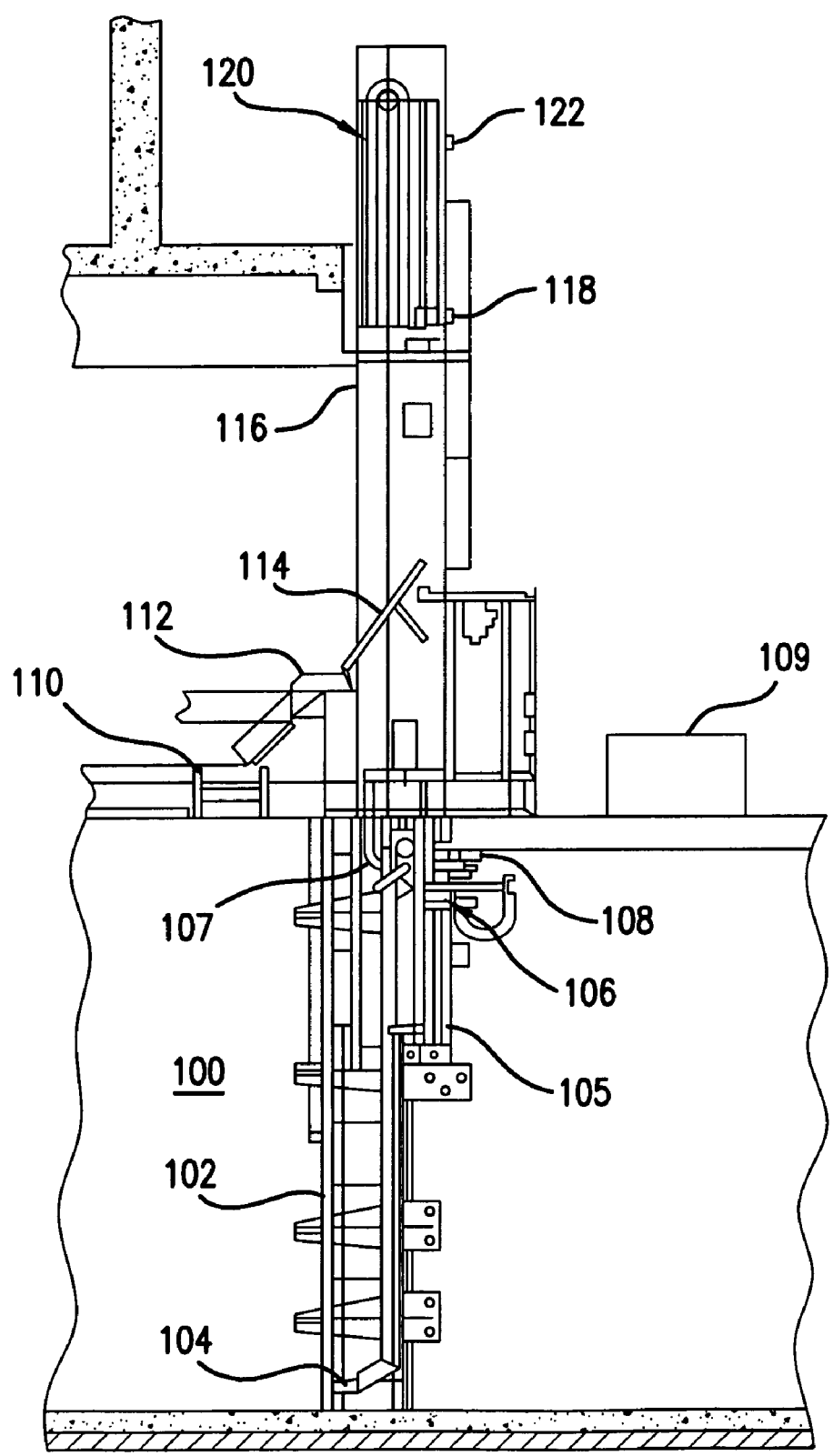
FIG. 1 illustrates a mechanical bar screen system.

FIG. 1 illustrates a mechanical bar screen system. Fluid channel 100 contains the influent, which is flowing at given flow rate through the channel. The flow rate of this fluid may periodically vary due not only to predetermined peak and off peak flow rates, but also to changes in demand or other conditions that may vary the flow rate in a manner that has not previously been determined. Trap 102 may extend down into fluid channel 100, trapping debris against it as the influent flows past. Those of ordinary skill in the art will appreciate that trap 102 may comprise any mechanism for collecting the debris, such as a wire screen, mesh, grating, porous material, etc. Trap 102 may be attached directly to fluid channel 100, although the invention is not limited thereto.

Rake 104 is shown in an extended position as it prepares to remove the debris collected on trap 102. Rake 104 may be operated by drive assembly 106, which is connected to hoist 120. In this embodiment, hoist 120 may be a pin rack and drive assembly 106 contains a cogwheel operating on the pin rack, although any mechanism capable of moving drive assembly 106 may be used, such as a rope and pulleys, etc. Hoist 120 drive assembly 106 may be operated by prime mover 108. Prime mover 108 may comprise any mechanism capable of moving driving assembly 106, such as an electric motor, a hydraulic motor, etc. Prime mover maybe located on drive assembly 106, or may be located separately. The invention is not limited.

This may be accomplished in any conventional manner. For example, prime mover 108 may circle drive assembly 106 around hoist 120 within frame 116; causing drive assembly 106, to move downward to the bottom of frame 116, around, and then back up; repeating this process as necessary. The movement of drive assembly 106, forces rake 104 down to the bottom of fluid channel 100 and up along bar screen 102.

Drive assembly 106 is preferably configured so that rake 104 is extended out away from bar screen 102 as it is lowered into fluid channel 100. For example, drive assembly 106 moves downward along pin rack 120, support arm 105 (which may be connected between rake 104 and drive assembly 106) may move outwardly due to its connection to drive assembly 106, causing rack 104 to move outwardly as well. As drive assembly 106 rounds the bottom of pin rack 120, support arm 105 forces rack 104 against bar screen 102, trapping the debris therebetween.

As drive assembly 106 then moves upward, rake 104 drags the debris up along bar screen 102 until it reaches discharge apron 112. Wiper 114 may then be used to wipe the debris away from rake 104, forcing the debris down into disposal cart 110. Once disposal cart 110 is filled, it may be removed and emptied. Of course, those of ordinary skill in the art will appreciate that any means of disposing of the debris may be used instead of cart 110, such as a conveyor, for example.

The speed of operation of prime mover 108 may be controlled by controller unit 109. In the case of a hydraulic motor, for example, controller unit 109 controls the amount (e.g., volume) and pressure of the hydraulic fluid circulating in the system, such as by using a flow control unit. In the case of an electric motor, controller unit 109 controls the speed of the motor, such as by varying the frequency using a variable frequency controller. Of course, those of ordinary skill in the art will appreciate that the invention is not limited thereto and that prime mover 108 and controller 109 may comprise any mechanism for moving a drive assembly 106, such as pneumatic systems, electromagnetic systems, etc. Moreover, prime mover 108 and controller 109 may comprise one device or several devices for accomplishing the movement of drive assembly 106.

A reverse motion proximity switch 118 may also be included for preventing drive assembly 106 from reversing motion over wiper assembly 114 to avoid any damage to wiper assembly 114. In operation, it may be necessary to reverse the motion of drive assembly 106, such as for cleaning or manually removing debris from the system. While moving in reverse, as the cogwheel of drive assembly 106 comes into proximity to wiper 114, proximity switch 118 disengages or stops prime mover 108, causing drive assembly 106 to stop before it passes over wiper 114. Similarly, an end of travel proximity switch 122 may be included to stop the motion of drive assembly 106. As drive assembly 106 contacts end of travel proximity switch 122 it disconnects or stops prime mover 108, stopping drive assembly 106. The interaction of proximity switches with electric motors and hydraulic motors is well-known to those of ordinary skill in the art and will not be further elaborated upon here.

Figure 2:
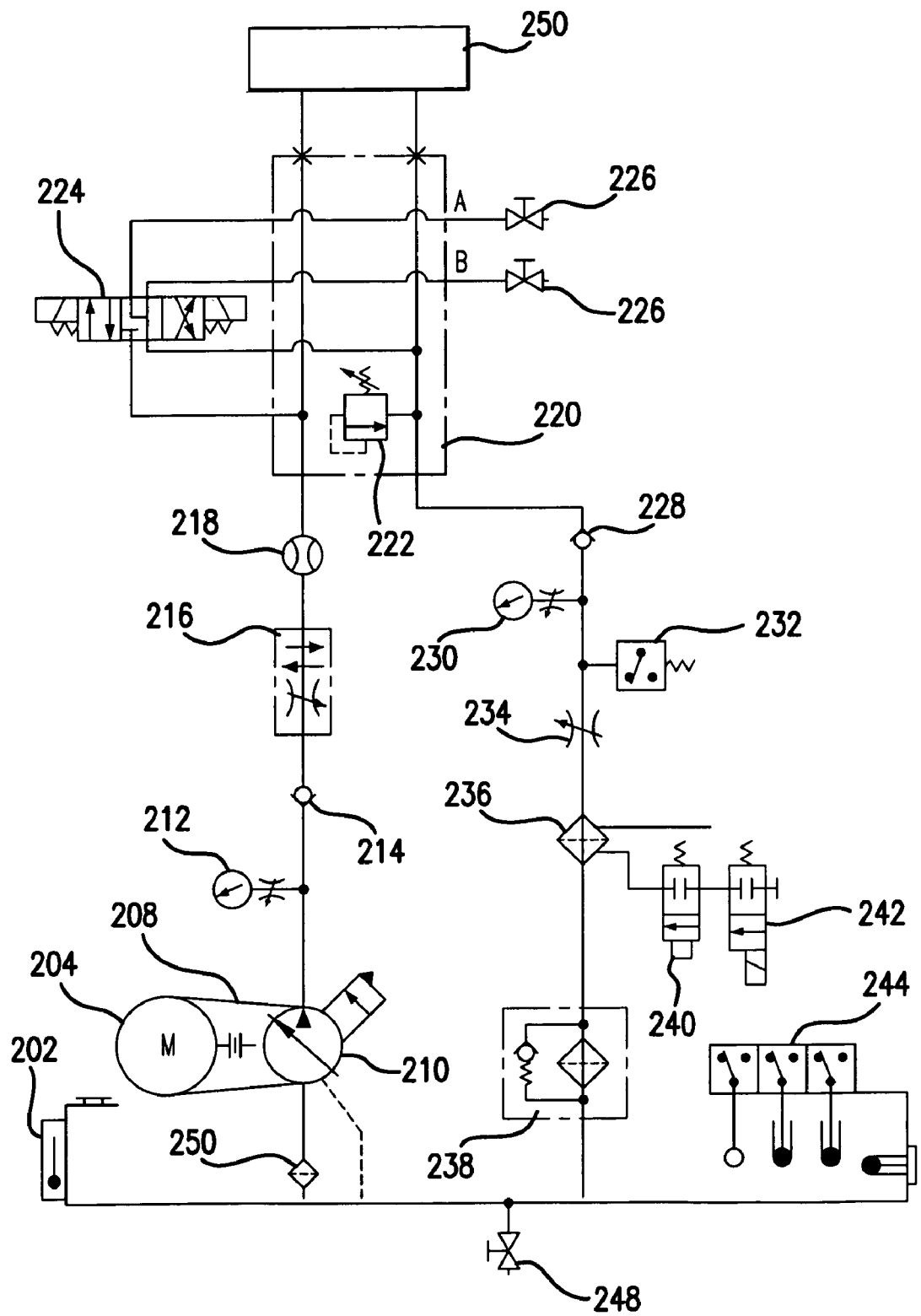
FIG. 2 illustrates a hydraulic mechanical bar screen system.

FIG. 2 illustrates a schematic for one embodiment of a variable speed control system in accordance with the invention. As shown in FIG. 2, motor 204 is connected to fluid pump 210 via coupling assembly 208. In this embodiment, the speed of motor 204 may remain constant (as the volume and pressure of fluid may be controlled by flow control 216). Coupling assembly 208 is also not particularly limited and may comprise, for example, a pump half coupling, motor half coupling, coupling spider and pump/motor adapter, the interconnection of which is well-known of those of ordinary skill in the art. Fluid pump 210 is also not limited, and may comprise, for example, a pressure compensating piston pump.

Fluid pump 210 may be connected to a pressure compensated flow control 216 through check valve 214. Shutoff valve and gauge 212 may also be incorporated for measuring the fluid flow from pump 210. Pressure compensated flow control 216 is not particularly limited and may comprise, for example, adjustable pressure compensated flow control, in which the flow of fluid through the valve may be continuously and/or incrementally varied across the flow range by opening or closing an internal piston within the flow control valve. The variation in flow may be done manually (such as by adjusting a knob) or automatically using a logic board or similar type of controller. The operation of fluid flow control systems is well known to those of ordinary skill in the art and will not be further elaborated upon here.

Pressure compensated flow control 216 may control the passage of fluid through flow meter 218 to subplate 220, which contains relief valve 222. Directional valve 224 may also be included for controlling the direction of hydraulic fluid flow to hydraulic motor 250. In addition, ball valves 226 may be included to provide flow to hydraulic motor 250, which may be in communication with drive assembly 106 and/or hoist 120, and may be driven by the hydraulic fluid circulated through this system in order to control the operation of rake 104.

The hydraulic fluid may then flow through check valve 228 and gauge 230 to pressure switch 232. After passing through needle valve 234, the fluid may pass through water/oil heat exchanger 236, where its temperature may be controlled by modulating water valve 240 and solenoid valve 242. The practice of using heat exchangers in this manner is well known to those of ordinary skill in the art and will not be further elaborated upon here.

Fluid passing through filter 238 may than be stored in reservoir 202 for reuse by fluid pump 210. Strainer 250 may also be included for removing particles from this stored fluid to prevent the particles from being carried through fluid pump 210.

A temperature/level switch 244 and bulb well 246 may be used for monitoring the level of hydraulic fluid in the system. Ball valve 248 may also be included for draining excess fluid from the system. Fluid may be replaced using an access port at the top of reservoir 202.

Figure 3:
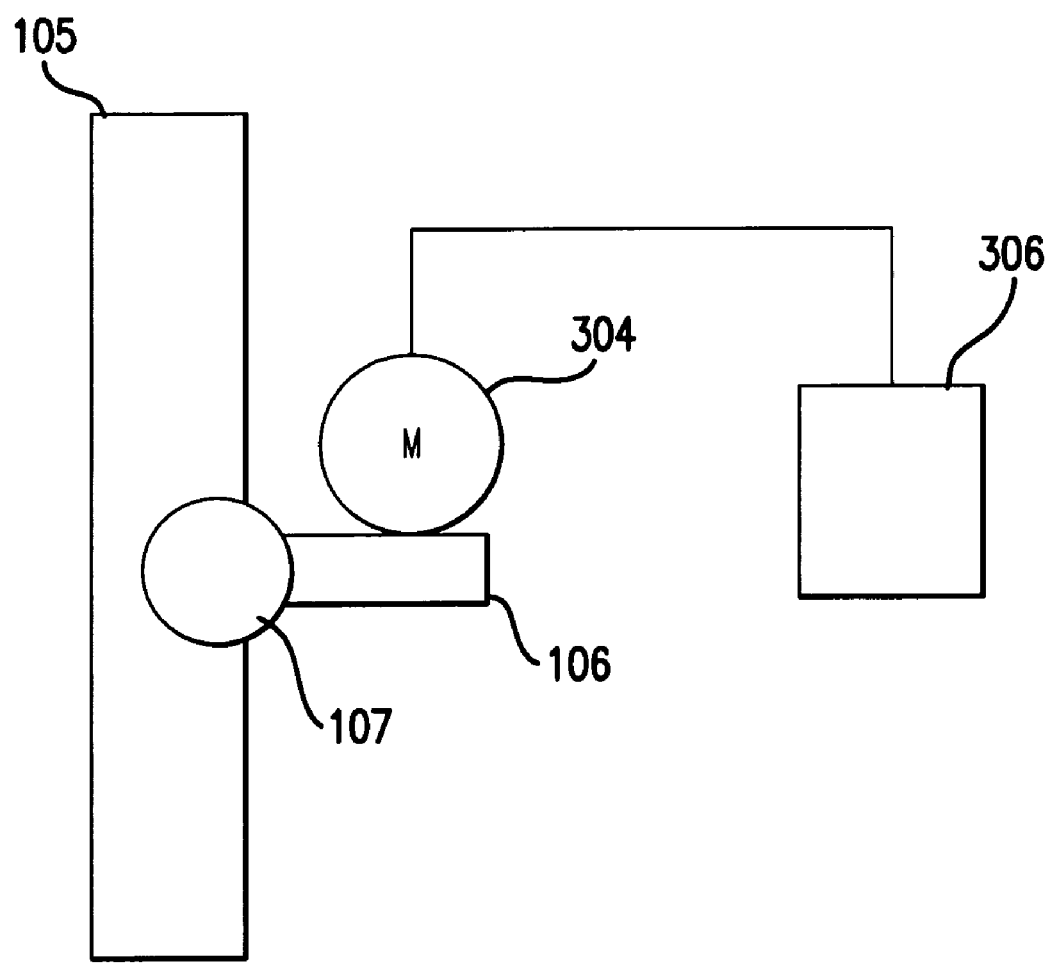
FIG. 3 illustrates an electrical mechanical bar screen system.

An alternative embodiment is shown in FIG. 3. In this embodiment, a variable speed electric motor system may be used. The speed of motor 304, which maybe located on carriage 106 or located separately therefrom, may be continuously and/or incrementally varied by controller 306. Motor 304 and controller 306 are not particularly limited, however, but may comprise, for example, a variable frequency drive and multi-phase motor, in which the speed of the motor may be controlled by varying the frequency of the current supplied to the motor. As the speed of motor 304 is varied, the speed of cogwheel 107 of carriage 106 is varied on pin rack 105, varying the speed of operation of rake 104.

Although this invention has been described with reference particular embodiments, it will be appreciated that many variations may be resorted to without departing from the spirit and scope of this invention. For example, any hoist system may be used for moving the rake up along the debris trap, such as, ropes and pulleys, geared systems, a pin rack, etc. Any system capable of moving a drive assembly along this hoist may be used as well, such as electrical, mechanical, hydraulic, pneumatic, electromagnetic, etc.

What is claimed is:

1. A variable speed mechanical bar screen comprising:
   a frame assembly;
   a bar screen that lowers into a fluid channel to collect debris from the fluid flowing in the channel;
   a pin rack located in the frame assembly above the bar screen;
   a drive for moving a cleaner assembly having a cogwheel associated with the pin rack to move the drive assembly thereon;
   a hydraulic motor that moves the drive assembly; and
   a variable speed controller that controls the flow of fluid to and from the hydraulic motor such that the drive assembly is movable in conjunction with ongoing variations in flow rate of the fluid flowing in the channel.

2. The variable speed mechanical bar screen of claim 1, wherein the variable speed controller comprises an adjustable pressure compensated fluid flow controller.

3. The variable speed mechanical bar screen of claim 1, further comprising a trap comprising one or more selected from the group consisting of a screen, a mesh, a grating, and a porous material.

4. The variable speed mechanical bar screen of claim 1, further comprising a proximity switch for substantially stopping the motion of the drive assembly when the drive assembly is operating in reverse and comes into proximity with a wiper located on said frame assembly.

5. The variable speed mechanical bar screen of claim 1, further comprising a proximity switch for stopping the motion of said drive assembly when the drive assembly comes into proximity with the switch.

6. The variable speed mechanical bar screen of claim 1, wherein the hydraulic motor comprises a motor that operates a fluid pump.

7. The variable speed mechanical bar screen of claim 6, wherein the motor operates at a constant speed.

* * * * *

UNITED STATES PATENT AND TRADEMARK OFFICE
CERTIFICATE OF CORRECTION

PATENT NO. : 7,144,500 B2 Page 1 of 1
APPLICATION NO. : 10/455069
DATED : December 5, 2006
INVENTOR(S) : Stephen M. Rybar and Roger D. Hamill It is certified that error appears in the above-identified patent and that said Letters Patent is hereby corrected as shown below:

In Column 4 (Claim 1), at line 59, after "drive", please insert --assembly--.

Signed and Sealed this

Thirteenth Day of March, 2007

JON W. DUDAS
*Director of the United States Patent and Trademark Office*